United States Patent
Kawada

(10) Patent No.: US 8,264,533 B2
(45) Date of Patent: Sep. 11, 2012

(54) VIDEO CONVERSION DEVICE, VIDEO CONVERSION METHOD, AND PROGRAM

(75) Inventor: Norihiko Kawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 12/549,453

(22) Filed: Aug. 28, 2009

(65) Prior Publication Data

US 2010/0053426 A1    Mar. 4, 2010

(30) Foreign Application Priority Data

Aug. 29, 2008   (JP) ................ P2008-222813

(51) Int. Cl.
 *H04N 3/36*    (2006.01)
(52) U.S. Cl. ............ 348/97; 348/100; 348/103; 352/46; 352/84
(58) Field of Classification Search ............. 348/78, 348/97, 100, 103; 352/46, 84
See application file for complete search history.

(56) References Cited

U.S. PATENT DOCUMENTS

| | | | | |
|---|---|---|---|---|
| 4,553,176 A | * | 11/1985 | Mendrala | 386/324 |
| 6,091,446 A | * | 7/2000 | Walker | 348/97 |
| 7,675,572 B2 | * | 3/2010 | Lee et al. | 348/441 |
| 7,856,055 B2 | * | 12/2010 | Zhou et al. | 375/240.12 |
| 2004/0046767 A1 | | 3/2004 | Cloutier | |
| 2005/0134801 A1 | | 6/2005 | Bogdanowicz et al. | |
| 2007/0098256 A1 | | 5/2007 | Kulkarni et al. | |

FOREIGN PATENT DOCUMENTS

| | | |
|---|---|---|
| EP | 1 239 668 | 9/2002 |
| EP | 1 845 703 | 10/2007 |
| JP | 2004-248066 | 9/2004 |
| WO | WO 2006 039357 | 4/2006 |

* cited by examiner

*Primary Examiner* — Khanh Dinh

(74) *Attorney, Agent, or Firm* — Frommer Lawrence & Haug LLP; William S. Frommer; Ellen Marcie Emas

(57) ABSTRACT

Disclosed herein is a video conversion device including a color characteristic memory, a color characteristic correction processor, a selector, and a controller.

9 Claims, 11 Drawing Sheets

4a (3DLUT)

VIDEO CONVERSION DEVICE, VIDEO CONVERSION METHOD, AND PROGRAM

BACKGROUND OF THE INVENTION

1. Field of the Invention

The present invention relates to a video conversion device, a video conversion method, and a program for correcting video characteristics of a video signal obtained by imaging with a video camera, and particularly to a technique suitable to be applied to characteristic correction in conversion into a cinema film.

2. Description of the Related Art

In cinema shooting in a related art, a negative film is directly obtained by using a movie camera for a film, and then a film for intermediate processing, such as a positive film, is created from the negative film. Thereafter, a film to be distributed for screening is obtained finally.

On the other hand, recent enhancement in the characteristics of a video camera, such as the resolution, causes an increase in the number of cases in which electronic imaging for a cinema is performed by using a video camera. In this electronic imaging, a video signal obtained by the video camera is electronically edited, and then a film to be distributed for screening is obtained from the edited video signal. Furthermore, there is also a system in which the whole of the cinema screening itself is performed based on electronic processing with use of a video projector.

The related-art scheme, in which film processing is carried out for all of the process from acquisition of a negative film to creation of a film to be distributed for screening, is a scheme that has been already technically established. In this scheme, the films, the development steps, and so on to be employed are selected in accordance with the purpose depending on what video to be finally obtained in screening.

On the other hand, in the electronic imaging, adjustment of the color tone, the contrast, and so on is carried out for a video signal obtained by a video camera by using an edit device capable of color correction. From the adjusted video signal, a film to be distributed for screening and a video signal for cinema screening are obtained.

SUMMARY OF THE INVENTION

Therefore, very advanced operation is desired in the edit with use of the video signal in order to obtain, by the electronic imaging, a color tone, contrast, and so on similar to those of the case in which film processing is carried out for all of the process from acquisition of a negative film to creation of a film to be distributed for screening.

A more specific description will be made below on this point. The color characteristics of a color film include additive color mixing and it has a characteristic that, depending on the brightness of the shooting subject, the color strength changes depending on the kind of film even with the same color. This characteristic is different from that of subtractive color mixing, on which the color signal of the video signal obtained by the electronic imaging system is based. Therefore, if the video signal needs to be converted into a film, generally transform coefficients on a multi-dimensional matrix for color conversion are obtained by actual measurement, experience, and intuition, for the conversion. Japanese Patent Laid-open No. 2004-248066 includes a description about a related art example for carrying out color conversion for a video signal.

However, there are a wide variety of films as the film used for cinema shooting and the characteristics of the films are different from each other. Furthermore, the characteristics of the display device as the conversion destination also cover a wide range. Therefore, operation of manually adjusting the conversion characteristics is desired each time. If advanced adjustment may not be manually carried out, representative transform coefficients on a multi-dimension matrix are used and therefore conversion for correct color reproduction is difficult.

For example, when video obtained by shooting with the electronic imaging system is desired to be screened by electronic screening with film characteristics, a person who is familiar with the film characteristics checks the image quality of the screening and brings the image quality closer to the film characteristics through setting of the multi-dimension matrix coefficients and repetition of recheck. Furthermore, the same operation is carried out also when video obtained by shooting with the electronic imaging system is printed on a film and screening of the film is performed.

In traditional cinema shooting without the electronic imaging, the video intended by a cinematographer is obtained through consultation with a developing station about selection of the shooting film and means of development processing for the film.

FIG. 14 is a diagram showing an example of the flow of cinema film processing in a related art.

A negative film 81 obtained by shooting with a film camera is subjected to development 82, and then is printed on a master positive film 84 by an optical printer 83. Furthermore, a duplicate negative 85 is created from the master positive film 84, and a print film 86 is obtained from the duplicate negative 85. Through development of the print film 86, a film 88 to be distributed for screening is created. This film 88 is distributed to a theater and used for screening of the cinema.

In this process, selection of the kind of film, the development process, and so on at the respective stages is carried out based on instructions from a cinematographer 89 of the cinema. Specifically, selection 91 of the kind of negative film 81, selection 92 of the process of the development 82, selection 93 of the timing in the printing by the optical printer 83, and selection 94 of the kind of master positive film 84 are carried out based on instructions from the cinematographer 89.

Furthermore, selection 95 of the duplicate negative film 85, selection 96 of the print film 86, and selection 97 of the process of the development 87 are carried out based on instructions from the cinematographer 89. For some cinemas, the creation of part of the films shown in FIG. 14 is omitted.

In this manner, selection of the kind of each film (selection of the film company, the kind of film, the sensitivity, etc.) is carried out in the process from acquisition of the negative film used in the shooting to acquisition of the film to be distributed for screening. This allows acquisition of video having the color tone and the contrast that are intended by the cinematographer.

For example, when solid video having high contrast is desired, the intended video can be obtained by selecting a shooting film having a large gamma value or performing push processing to thereby set the gamma value after the development high. However, for electronic video, the creation means is different. Therefore, the cinematographer needs to commission a technical person for converting electronic video into film-look video to obtain the intended video as described above. However, there is a limit to successful communication of the intended video depicted in the mind of the cinematographer to somebody else for realization of the intended video. Therefore, the intended video may not be obtained in many cases. Accordingly, the cinema industry has a tendency of avoidance of electronically-imaged video and return to video creation with films. This problematically precludes popularization of the electronic imaging, which offers various advantages.

Furthermore, in the techniques for a cinema film, special processing is frequently performed at the time of development to thereby obtain special video. It is also difficult to apply such special processing to the electronic imaging. For example, in development of a cinema film, special development processing called skip bleach is often performed to obtain characteristic video having increased contrast and lowered color saturation. It is difficult to apply this skip bleach technique to the related-art electronic imaging. Furthermore, the effect of the skip bleach itself is also subtly different between the skip bleach performed in development of a negative film and the skip bleach performed in development of a film to be distributed for screening. However, it is difficult to vary the adjustment condition also in consideration of such a difference in editing by the related-art electronic imaging system.

There is a need for the present invention to allow color correction and so on for video obtained by electronic imaging to be easily carried out similarly to the case of processing video obtained by shooting with a film.

According to a mode of the present invention, color characteristic storing processing is executed. In this processing, color characteristics of a plurality of kinds of cinema films, color characteristics relating to a plurality of kinds of development processes in development of a cinema film, and color characteristics relating to adjustment of a film printer are stored.

Furthermore, color characteristic correction processing is executed. In this processing, for an input video signal, correction is carried out with use of a color characteristic that is stored in the color characteristic storing processing and relates to the kind of cinema film, a color characteristic that is stored in the color characteristic storing processing and relates to a development process, and a color characteristic in printing of a cinema film.

In addition, selection processing of selecting the respective items similarly to the case of processing a cinema film is executed based on operation with a predetermined operation screen. As the selection, selection of a negative film, selection of a film for intermediate processing for acquisition of a film for screening from the selected negative film, and selection of the film for screening are carried out. Moreover, selection of development processes for the respective selected films and selection of the color characteristic of the film printer are carried out.

Based on the selection in this selection processing, the color characteristics that are stored in the color characteristic storing processing and each correspond to a respective one of the selected items are read out. In addition, control of carrying out correction with all of the read color characteristics as the color characteristic correction processing is carried out.

Due to this configuration, through selection of cinema films, development processes, and so on as the basis on the operation screen, electronic imaging with color characteristics similar to those in the case in which film shooting is performed by employing the cinema films and the development processes is permitted.

According to the mode of the present invention, by selecting the kinds of cinema films, development processes, and so on similarly to the case of film shooting on the operation screen, a video signal is allowed to have color characteristics similar to those in the case of shooting with use of the selected cinema films and development processes. Therefore, only through traditional selection for films, such as selection of the kinds of cinema films and selection of the development processes performed for the films, processing for allowing a video signal obtained by imaging with a video camera to have the desired color characteristics can be executed. Thus, a person who performs editing and so on with a cinema film traditionally can give the desired color characteristics to a video signal obtained by shooting with a video camera directly, by utilizing the skill for treating the cinema film. This contributes to popularization of electronic imaging.

DETAILED DESCRIPTION OF THE PREFERRED EMBODIMENT

One embodiment of the present invention will be described below with reference to FIGS. 1 to 13.

Figure 1:
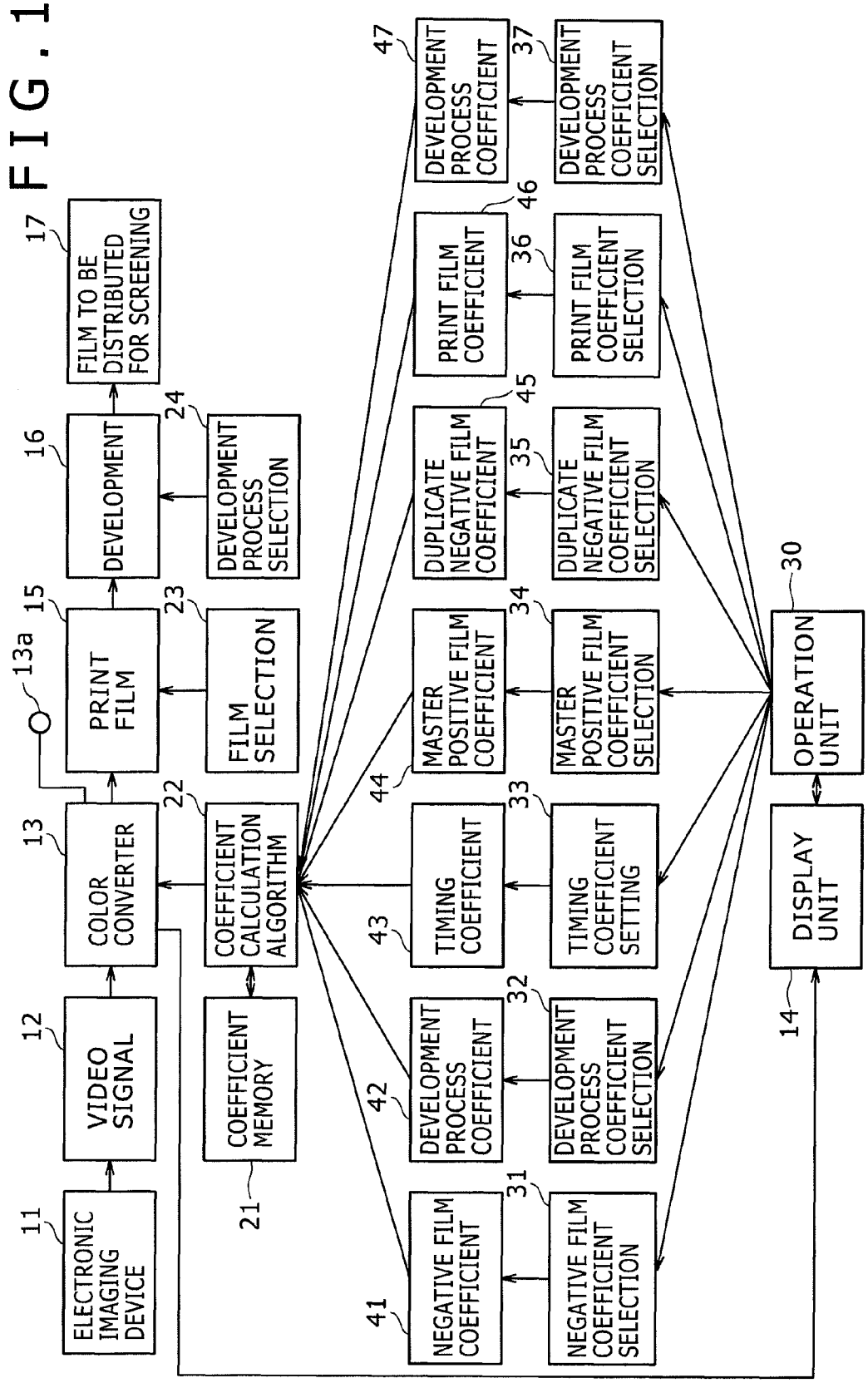
FIG. 1 is a block diagram showing a device configuration example according to one embodiment of the present invention.
Figure 2:
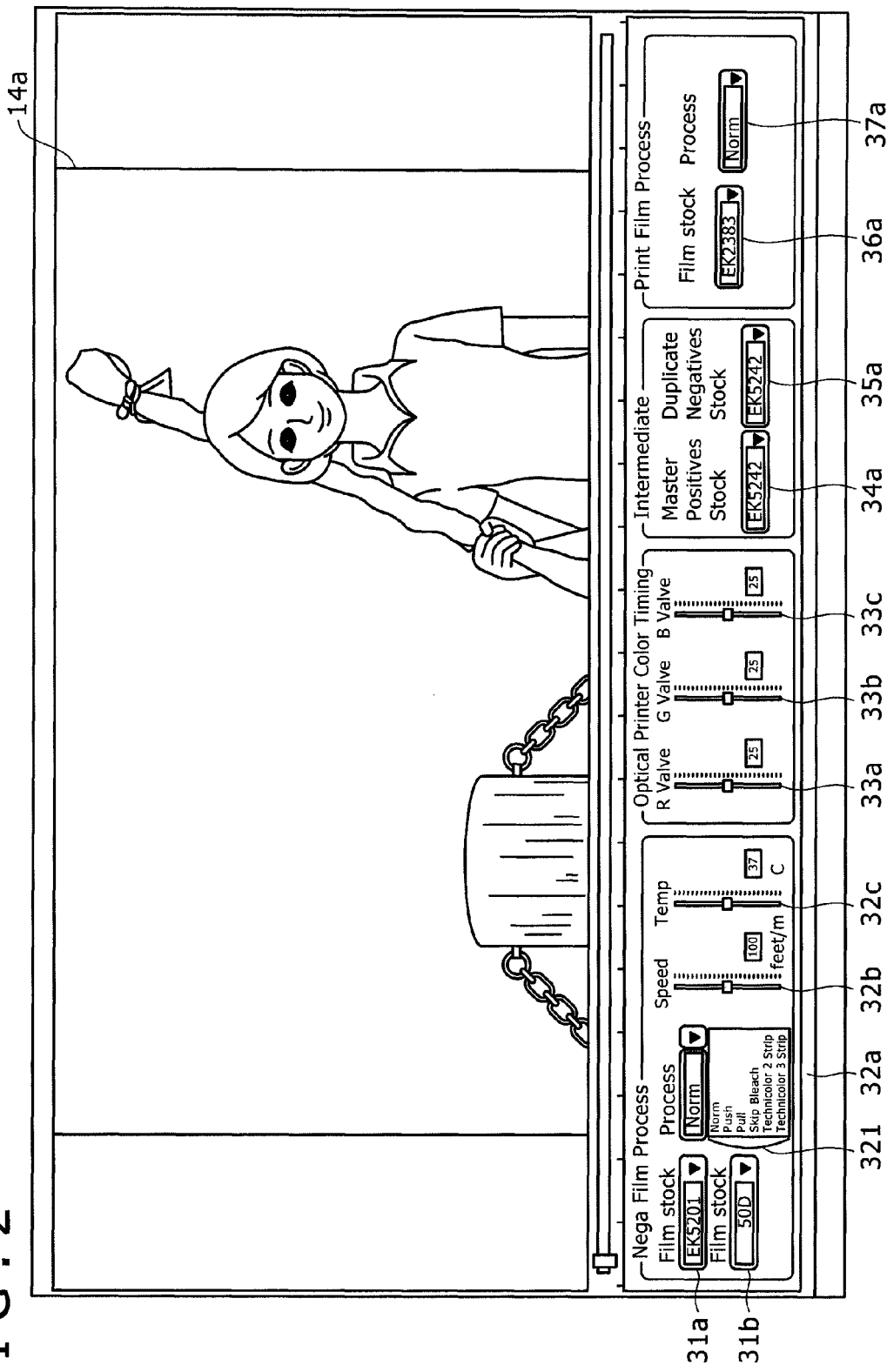
FIG. 2 is an explanatory diagram showing an example of an operation screen and a video display screen according to one embodiment of the present invention.
Figure 3:
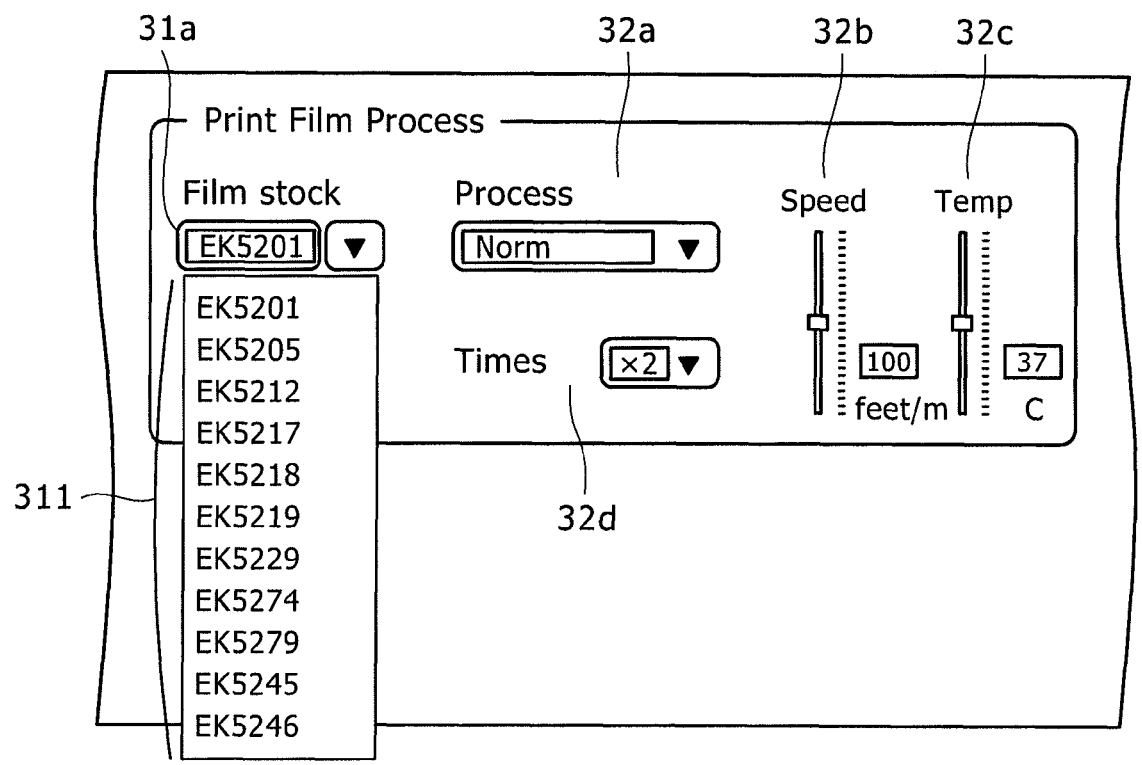
FIG. 3 is an explanatory diagram showing an example of a major part of the operation screen according to one embodiment of the present invention.
Figure 4:
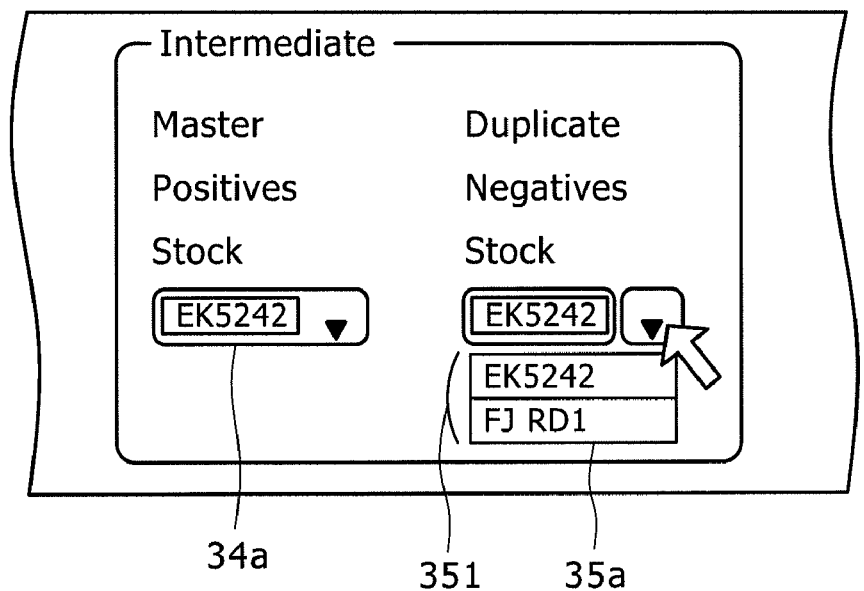
FIG. 4 is an explanatory diagram showing an example of a major part of the operation screen according to one embodiment of the present invention.
Figure 5:
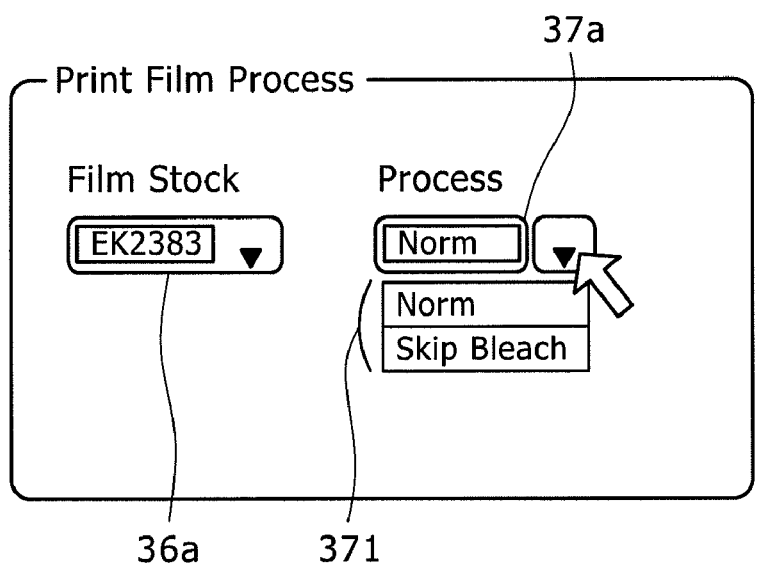
FIG. 5 is an explanatory diagram showing an example of a major part of the operation screen according to one embodiment of the present invention.
Figure 6:
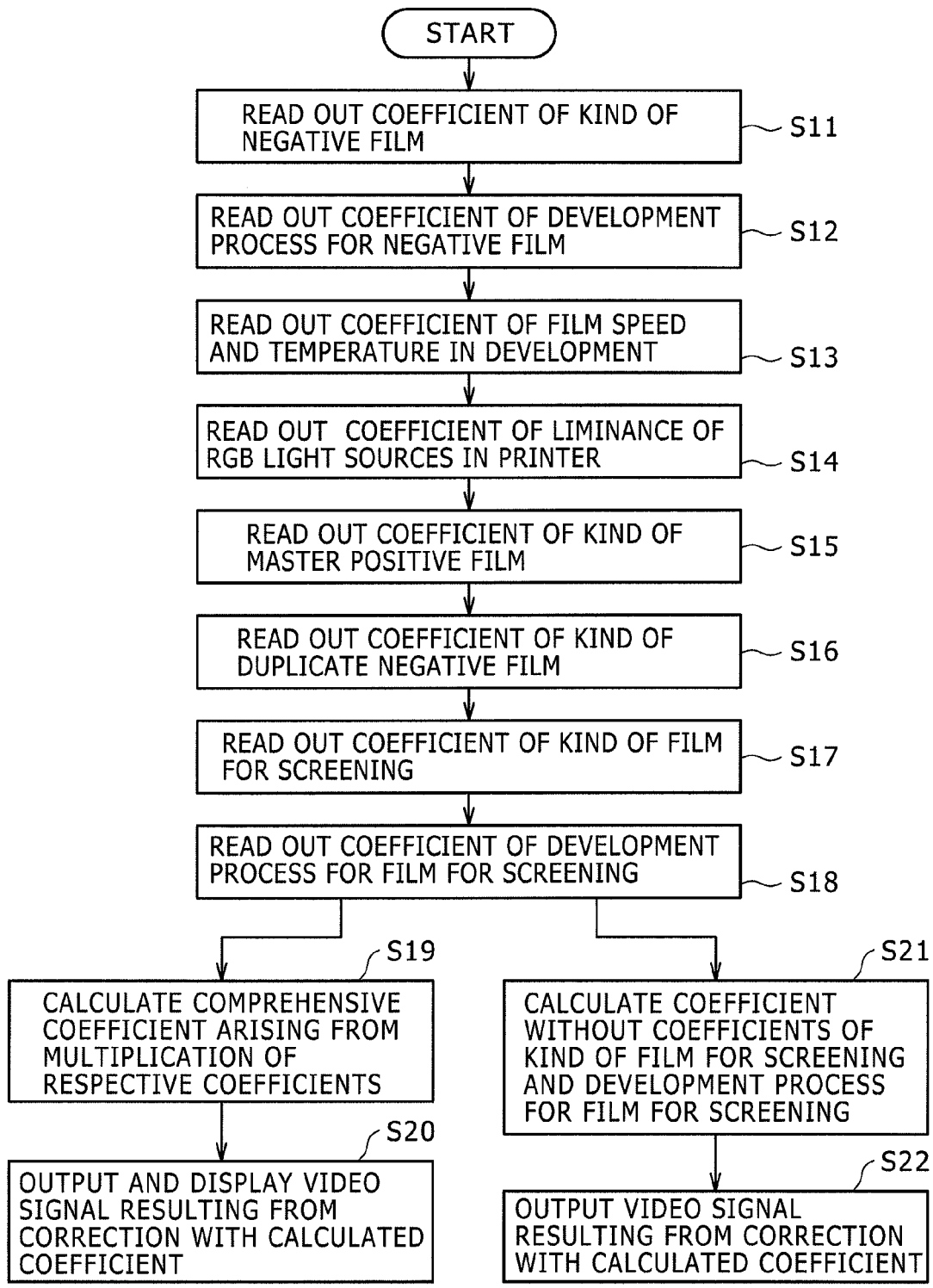
FIG. 6 is a flowchart showing an example of a signal processing condition according to one embodiment of the present invention.

The embodiment will be described below in the following order.
1. Description of Device Configuration: FIG. 1
2. Example of Operation Screen: FIGS. 2 to 5
3. Example of Processing Flow: FIG. 6
4. Specific Example of Color Correction Processing: FIGS. 7 to 13

5. Advantageous Effects of Embodiment and Modification Examples

1. Description of Device Configuration

FIG. 1 is a diagram showing a configuration example of the present embodiment.

The present embodiment is application to a system for creating a film to be distributed for screening of a cinema (or a video signal for electronic screening) from a video signal obtained by using an imaging device that is a video camera.

FIG. 1 is a system configuration diagram showing the whole of a device for executing processing according to the present embodiment. Initially a description will be made along the blocks on the uppermost row in FIG. 1. A video signal imaged and output by an electronic imaging device 11 that is a video camera is supplied to a video signal input unit 12. The video signal input unit 12 may store the input video signal.

The video signal input to the video signal input unit 12 is supplied to a color converter 13. In the color converter 13, color conversion processing is executed in accordance with color conversion coefficients and so on set based on operation to be described later. Details of the color conversion processing will be described later. In this color conversion processing, the level of each color signal of three primary color signals, which form the video signal, is corrected. Therefore, in addition to adjustment of the color balance, correction of the entire luminance level, such as contrast adjustment, is also included in this color conversion processing.

The video signal resulting from the conversion in the color converter 13 is supplied to a print film creator 15, and a print film is created. The created print film is subjected to development in a development part 16, so that a film to be distributed for screening 17 is obtained through the development.

In addition, the video signal resulting from the conversion in the color converter 13 is supplied to a display unit 14, so that the video resulting from the conversion processing is displayed thereon. Furthermore, the video signal resulting from the conversion in the color converter 13 can be output from a video signal output unit 13a. The video signal output from the video signal output unit 13a is a video signal for electronic screening with use of a video projector and is recorded in a medium such as a hard disk.

Of these video signals resulting from the processing in the color converter 13, the video signal supplied to the display unit 14 and the video signal output from the output unit 13a are different from the video signal supplied to the print film creator 15 in the processing state. This difference will be described in detail later.

In the color conversion in the color converter 13, coefficient values stored in a coefficient memory 21 are read out to a coefficient calculation algorithm unit 22 and a color conversion characteristic arising from synthesizing of the read coefficients is calculated by the coefficient calculation algorithm unit 22. The calculated color conversion characteristic is supplied to the color converter 13, and the color converter 13 executes color correction processing for the video signal in accordance with the specified color conversion characteristic. Therefore, the coefficient calculation algorithm unit 22 and the peripheral processing unit serve as the controller that controls the color conversion in the color converter 13. The coefficient values stored in the coefficient memory 21 are obtained through actual measurement of the respective characteristics such as the color characteristics of the respective films.

The kind of cinema film used as the print film to be created by the print film creator 15 is selected by the operator with the film selector 23. As the development process in the development part 16, the process selected by the development process selector 24 is carried out. Examples of the film and the process that can be selected will be described later.

The coefficients used in the calculation by the coefficient calculation algorithm unit 22 are decided in the following respective units. Specifically, a negative film coefficient decider 41, a development process coefficient decider 42, a timing coefficient decider 43, a master positive film coefficient decider 44, a duplicate negative film coefficient decider 45, a print film coefficient decider 46, and a development process coefficient decider 47 are used. Each of the deciders 41 to 47 decides the coefficient corresponding to the set selection state or condition by reading out the coefficient from the coefficient memory 21 or calculating the coefficient, and supplies the decided coefficient value for the color conversion to the coefficient calculation algorithm unit 22.

The coefficient decided by the negative film coefficient decider 41 is based on selection by a negative film coefficient selector 31 about the negative film that is supposed to be used.

The coefficient decided by the development process coefficient decider 42 is based on selection by a development process coefficient selector 32 about the development process that is supposed to be carried out for the negative film.

The coefficient decided by the timing coefficient decider 43 is based on selection by a timing coefficient setter 33 about the setting state in the printer at the time of copying from the negative film to the master positive film.

The coefficient decided by the master positive film coefficient decider 44 is based on selection by a master positive film coefficient selector 34 about the master positive film that is supposed to be used.

The coefficient decided by the duplicate negative film coefficient decider 45 is based on selection by a duplicate negative film coefficient selector 35 about the duplicate negative film that is supposed to be used.

The coefficient decided by the print film coefficient decider 46 is based on selection by a print film coefficient selector 36 about the print film that is supposed to be used.

The coefficient decided by the development process coefficient decider 47 is based on selection by a development process coefficient selector 37 about the development process that is supposed to be carried out for the print film.

The selection by each of these selectors 31 to 37 is carried out based on operation with an operation unit 30. In the present example, the respective selection items are displayed on the screen of the display unit 14 under control by the operation unit 30, and one item is selected from the displayed items by operation with a pointing device or the like (not shown).

2. Example of Operation Screen

FIG. 2 shows an example of the display screen of the display unit 14 according to the present embodiment.

A video display area 14a exists on the upper side of the display screen of the display unit 14 in FIG. 2, and the video that is being edited is displayed in the video display area 14a. The video that is being edited is video resulting from correction of the color characteristics.

A selection screen for the respective selection items is displayed on the lower side of the display screen of the display unit 14. This selection screen is so configured that selection about any selection item can be carried out by putting a cursor on the screen onto this selection item. FIGS. 3 to 5 are enlarged diagrams showing details of the respective parts of the selection screen shown in FIG. 2.

The respective selection items will be described below in order from the left side in FIG. 2.

The selection screen has a negative film selection indication 31a serving as the negative film coefficient selector 31. Furthermore, the selection screen has a development process selection indication 32a for the negative film, a film speed selection indication 32b, and a developer temperature selection indication 32c that serve as the development process coefficient selector 32.

In addition, the selection screen has color level selection indications 33a, 33b, and 33c that serve as the timing coefficient setter 33 and are used to give instructions to adjust the luminance of each of the light sources of three primary colors in the optical printer.

Moreover, for selection of films for intermediate processing, the selection screen has a master positive film selection indication 34a serving as the master positive film coefficient selector 34 and a duplicate negative film selection indication 35a serving as the duplicate negative film coefficient selector 35.

Furthermore, the selection screen has a print film selection indication 36a serving as the print film coefficient selector 36 and a development process selection indication 37a for the print film, serving as the development process coefficient selector 37.

Of these respective selection indications, the film selection indications are so configured that plural kinds of films as the candidates are prepared therein and one film can be selected from the candidate films.

Specifically, for example, as shown in FIG. 3, a candidate film indication 311 is made for the negative film selection indication 31a to thereby show plural kinds of codes representing the product numbers of films that are generally used as a negative film for a cinema. Operation of selecting any one negative film from the candidate film indication 311 is carried out, and thereby the code of the selected film is shown in the negative film selection indication 31a.

In linkage with the selection of the kind of film with the negative film selection indication 31a, the sensitivity (ISO value) of the selected film is shown in a sensitivity indication 31b. For the negative films shown as the candidates, the coefficients for reproducing the color characteristics of the respective films are stored in the coefficient memory 21. Through the selection, the correction coefficient of the selected film is read out from the memory 21.

As for the development process selection indication 32a for the negative film, any one development process is selected from a development process candidate indication 321 as shown in FIG. 2 for example.

Examples of the development process that can be selected include normal processing, push processing, pull processing, and special processing called "skip bleach." From these processes, the process that is supposed to be employed is selected. Furthermore, as shown in FIG. 3, for the push processing and the pull processing, an indication 32d for selection of the degree of the sensitization or the desensitization is provided. The coefficient values of the color characteristics corresponding to these development processes are also stored in the coefficient memory 21. Through the selection, the correction coefficient of the selected development condition is read out from the memory 21.

Moreover, as shown in FIG. 2, the film speed selection indication 32b and the developer temperature selection indication 32c relating to the development are provided for the development process. The coefficient values corresponding to the respective selection values of the film speed and the developer temperature are also stored in the coefficient memory 21, and the correction coefficient of the selected development condition is read out from the memory 21. The film speed and the developer temperature in the development are automatically set to the proper values in response to the selection of the development process such as the push processing. In addition to this automatic setting, the film speed and the developer temperature can be further adjusted.

By the color level selection indications 33a, 33b, and 33c, which serve as the timing coefficient setter 33 and are used to give instructions to adjust the luminance of each of the light sources of three primary colors in the optical printer, the luminance of each of the primary colors can be adjusted to one of plural levels. The coefficient values corresponding to the respective adjustment values are stored in the coefficient memory 21, and the coefficient of the selected adjustment condition is read out from the memory 21.

As for each of the master positive film selection indication 34a and the duplicate negative film selection indication 35a, the kind of film is selected from the candidates, as shown in FIG. 4. In the example of FIG. 4, a candidate film indication 351 is made for the duplicate negative film selection indication 35a. The coefficients for reproducing the color characteristics of the respective candidate films are stored in the coefficient memory 21. Through the selection, the correction coefficient of the selected film is read out from the memory 21.

By the print film selection indication 36a and the development process selection indication 37a for the print film, the kind of film and the development condition for the film can be selected as shown in FIG. 5. For the print film, there are two kinds of processes as the selection candidates of the development process as shown in an indication 371: normal processing and skip bleach. The correction coefficients corresponding to the respective candidates are stored in the coefficient memory 21. Through the selection, the correction coefficients of the selected film and development processing are read out from the memory 21.

3. Example of Processing Flow

With reference to the flowchart of FIG. 6, a description will be made below about an example of processing of, in the configuration of FIG. 1, reading out color correction coefficients from the memory 21 and calculating a correction coefficient based on the read coefficients.

Initially, the coefficient of the film selected as the kind of negative film is read out (step S11). Subsequently, the coefficient of the process selected as the development process for the negative film is read out (step S12). Subsequently, the coefficients of the values selected as the film speed and the temperature in the development are read out (step S13). Subsequently, the coefficient based on the set values of the luminance of the light sources of the respective primary colors (RGB) in the film printer is read out (step S14). Furthermore, the coefficient of the film selected as the master positive film is read out (step S15). Subsequently, the coefficient of the film selected as the duplicate negative film is read out (step S16). Subsequently, the coefficient of the film selected as the film to be distributed for screening is read out (step S17). Subsequently, the coefficient of the condition selected as the development process for the film to be distributed for screening is read out (step S18).

After the above-described respective coefficients are read out, a comprehensive correction coefficient arising from multiplication of the respective coefficients is calculated (step S19). Furthermore, the input video signal is corrected with the calculated correction coefficient, and the corrected video signal is output from the video signal output unit 13a shown in FIG. 1 and used as video displayed on the display unit 14 (step S20).

Moreover, separately from these steps, another comprehensive correction coefficient is calculated without the coefficient corresponding to the kind of film for screening and the coefficient corresponding to the development process for the film for screening (step S21). The video signal resulting from the color correction with the calculated correction coefficient is supplied to the print film creator 15 (step S22).

By selecting the kinds of films, the development processes, and so on in this manner similarly to the case of film shooting, a video signal having the color characteristics equal to those obtained with the films and the development processes can be obtained.

Therefore, through selection similar to that for cinema creation by actual film processing, the color tone, the contrast, and so on that are finally obtained can be checked. This feature allows a person skilled in editing with a film to easily obtain a film to be distributed for screening, having the desired color tone, with operability similar to that in the case of selecting a film and so on for actual film processing.

4. Specific Example of Color Correction Processing

A specific example of the color correction processing employed in the present embodiment will be described below with reference to FIGS. 7 to 13.

Figure 7:
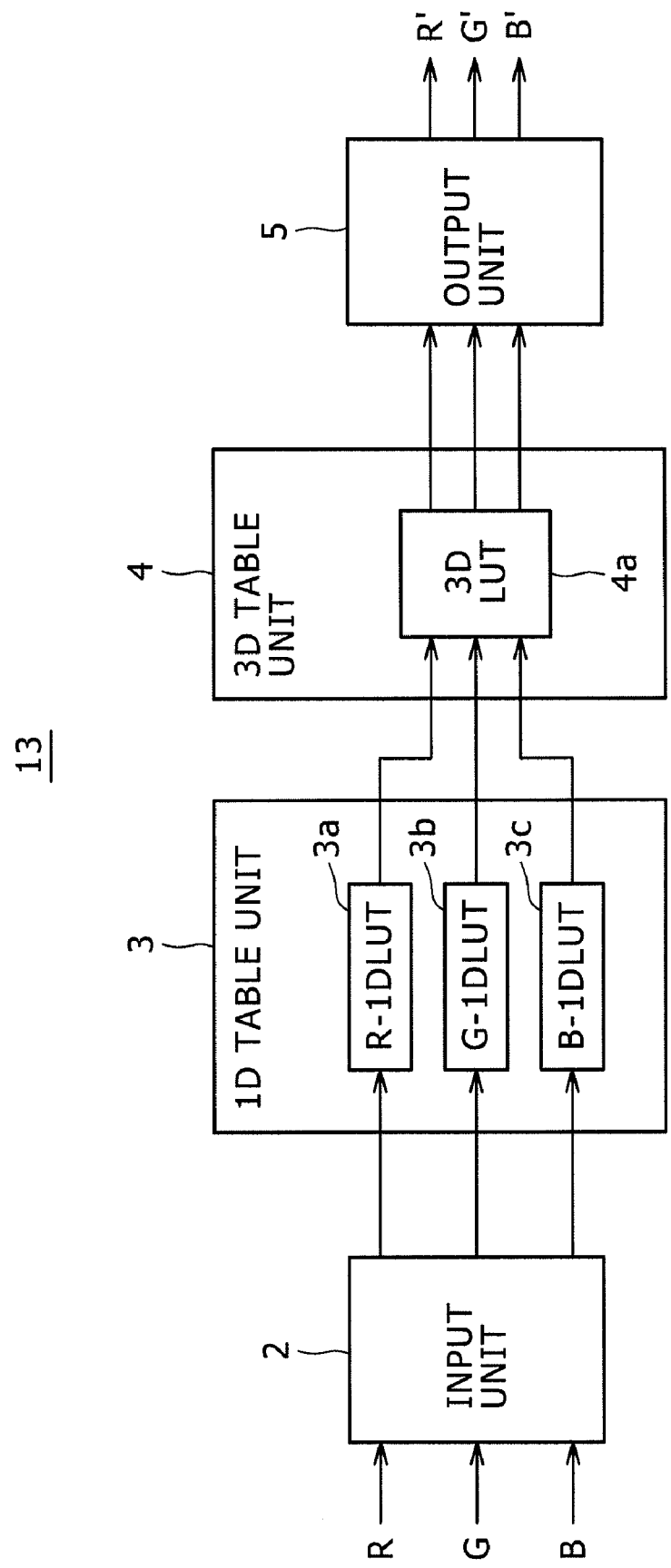
FIG. 7 is a block diagram of a configuration example of color gamut conversion processing according to one embodiment of the present invention.

FIG. 7 shows a specific example of the color converter 13 in FIG. 1.

As the example of FIG. 7, an example of the inside of the color converter 13 is shown. The color converter 13 includes an input unit 2, a 1D table unit 3, a 3D table unit 4, and an output unit 5.

To the input unit 2, an R value, a G value, and a B value are input as a video signal (video data) as the subject of color gamut conversion. The input unit 2 transfers the RGB values of the input video data to the 1D table unit 3.

Corresponding to the R value, the G value, and the B value, the 1D table unit 3 includes a one-dimensional lookup table 3a for the R value (hereinafter, referred to as the R-1DLUT), a one-dimensional lookup table 3b for the G value (hereinafter, referred to as the G-1DLUT), and a one-dimensional lookup table 3c for the B value (hereinafter, referred to as the B-1DLUT), respectively. The 1D table unit 3 refers to these 1DLUTs 3a, 3b, and 3c and performs one-dimensional transform of the input R value, G value, and B value to output the resulting values.

Figure 8:
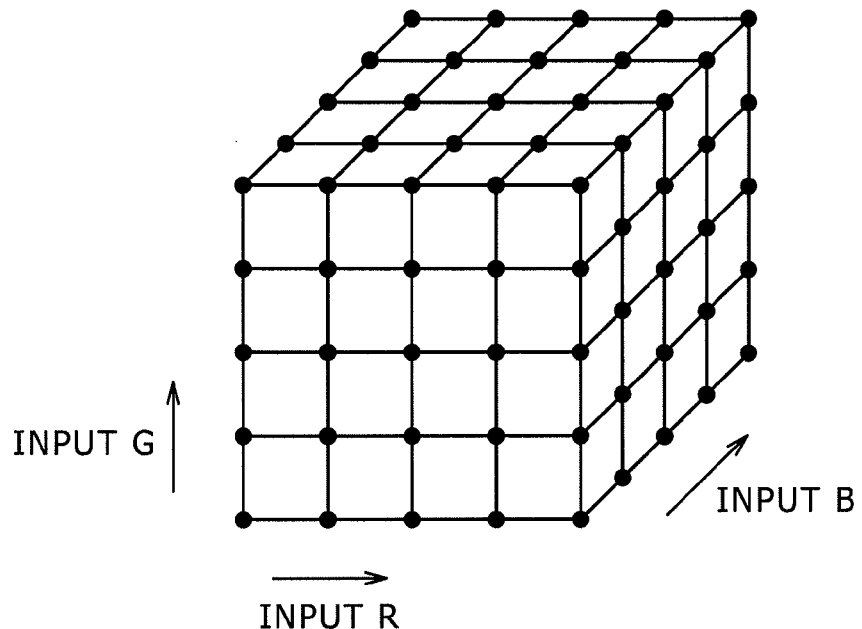
FIG. 8 is an explanatory diagram of a 3DLUT according to one embodiment of the present invention.

The 3D table unit 4 includes a three-dimensional lookup table (3DLUT) 4a having a cubic structure based on the R axis, the G axis, and the B axis. For example, an example of the 3DLUT 4a is shown in FIG. 8. For simplified description, a 3DLUT in which transform coefficients of 5×5×5 exist on the respective axes is shown in FIG. 8. In this case, the respective RGB values as transform output values are stored at the respective grid points indicated by the black circles. In this table, 125 grid points exist. That is, this table is a transform table in which 125 output R, G, B values or coefficient values for deriving the output R, G, B values are stored depending on the combination of the R, G, B values each of which is divided into five stages. For example, if input of R, G, B values of eight bits is assumed, it is preferable to employ a 3DLUT in which the number of transform coefficients on the respective axes is 17×17×17.

The 3D table unit 4 refers to one grid point (transform coefficient point) based on the R value, the G value, and the B value input from the 1D table unit 3 to thereby obtain an R' value, a G' value, and a B' value to be output.

The output unit 5 outputs the video data corresponding to the RGB values obtained in the 3D table unit 4, i.e. the video data resulting from the color gamut conversion.

In this configuration, the transform coefficients in the 1DLUTs 3a, 3b, and 3c and the 3DLUT 4a are set in the following manner.

A consideration will be made below on the axis of the input R value in the 3DLUT 4a and the R-1DLUT 3a.

Figure 9:
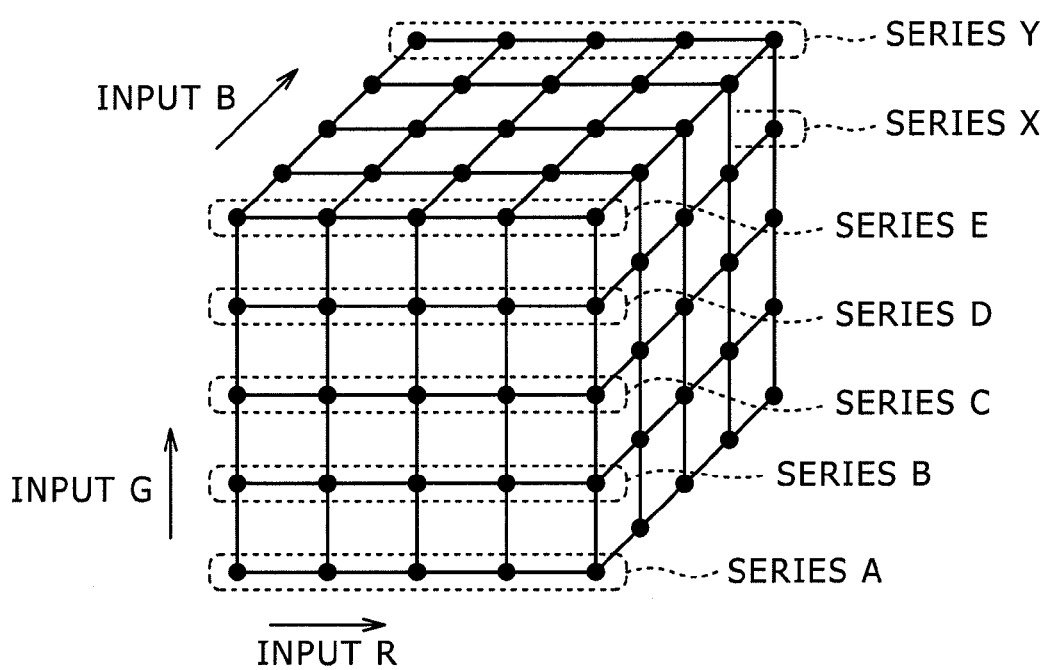
FIG. 9 is an explanatory diagram of one-dimensional series included in the 3DLUT according to one embodiment of the present invention.

As shown in FIG. 9, when the R axis of the 3DLUT 4a is regarded as the basis, 25 unit series of series A, series B, ... series Y exist as one-dimensional series that includes five grid points and is along the R axis. Each series has transform coefficients for the input and output values of the R value when the G value and the B value are fixed.

Figure 10:
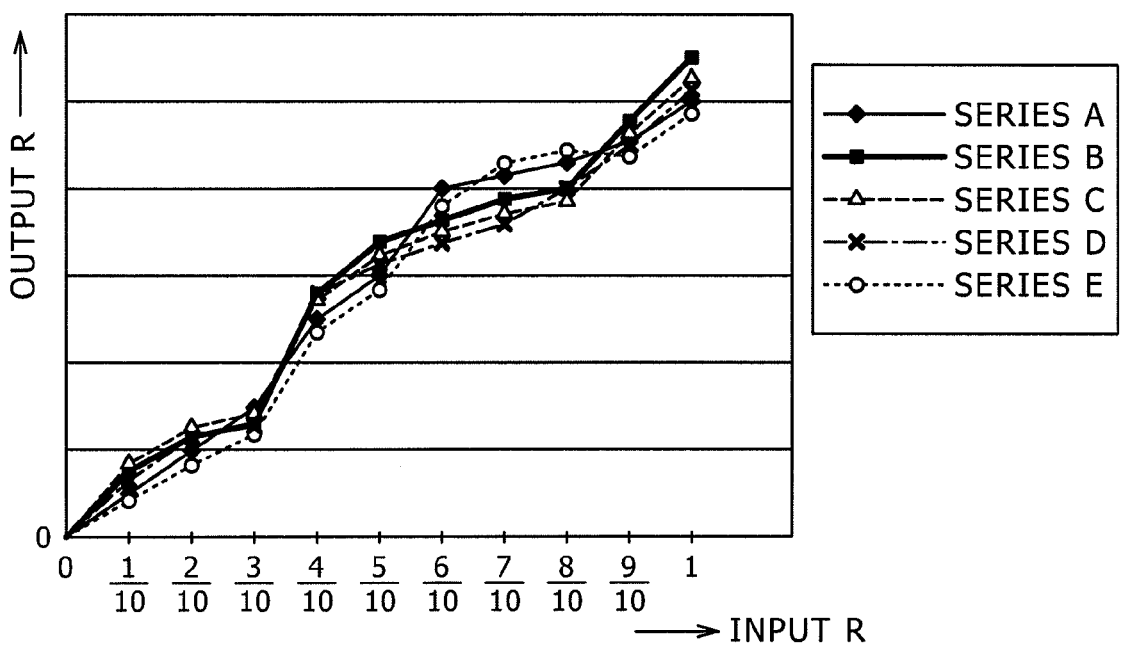
FIG. 10 is an explanatory diagram of three-dimensional transform coefficients of the respective series in color gamut conversion.

FIG. 10 shows the transform coefficients for the R value, in series A to E of these 25 series. In FIG. 10, the abscissa indicates the input R value and the ordinate indicates the output R value. In the 3DLUT 4a, the number of transform coefficients in one series is five, i.e. the R values from the minimum value to the maximum value are divided into five stages. On the other hand, FIG. 10 shows the state in which the number of transform coefficients in one series is eleven. In this case, the R values from the minimum value to the maximum value are divided into eleven stages. The minimum value and maximum value of the stages are defined as 0 and 1, respectively, and the stages therebetween are represented as $1/10, 2/10, \ldots$.

However, the transform coefficients in the respective series in FIG. 10 are transform coefficients when it is assumed that a 1DLUT is not used unlike the present example but the color gamut conversion is performed with only a 3DLUT like a related art.

The respective transform coefficients for the R value differ from series to series as shown in FIG. 10. The transform coefficients are different also among the respective series to series Y, although not shown in the diagram.

Figure 11:
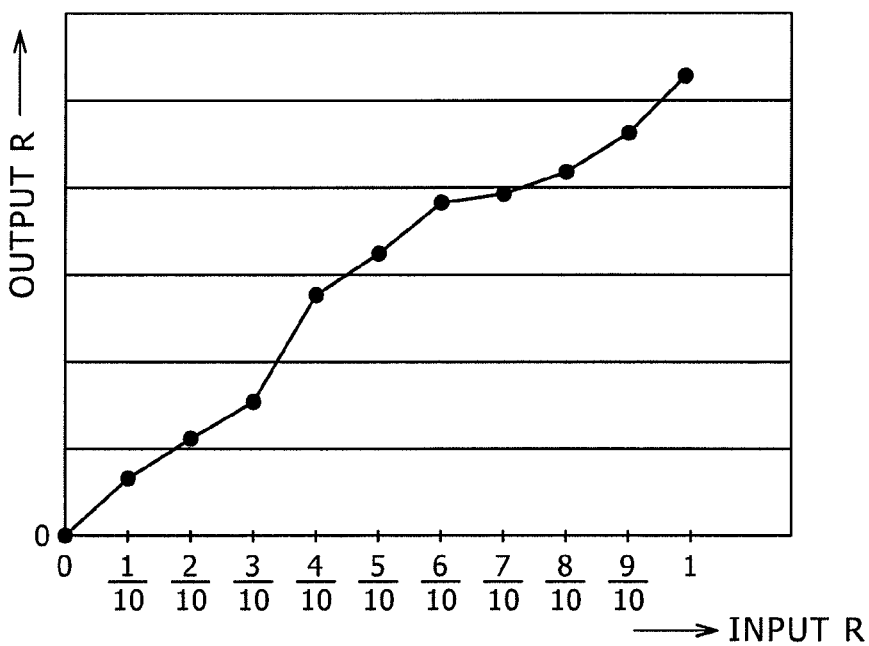
FIG. 11 is an explanatory diagram of transform coefficients in a 1DLUT according to one embodiment of the present invention.

Here, an assumption is made in which the values in FIG. 11 are obtained as a result of calculation of the variance value of the values of each stage about series A to Y. The values in FIG. 11 are equivalent to the average transform coefficients for the R value. That is, the values can be regarded as common one-dimensional components of the transform coefficients for the R value, in the respective series relating to the three-dimensional transform.

The R-1DLUT 3a performs transform of the R value with the eleven-stage transform coefficients as one-dimensional components like those in FIG. 11.

On the other hand, the transform coefficient values like those in FIG. 10 are used as the transform coefficients for the R value in the respective series in the 3DLUT 4a in FIG. 9 unless transform by the 1DLUT 3a is taken into consideration. However, in the present example, the R values resulting from transform of the common components of the respective series by the 1DLUT 3a with the transform coefficients in FIG. 11 are input as the R values to the 3DLUT 4a. Thus, it is sufficient that the respective series in the 3DLUT 4a include, as transform coefficients, the values indicating the deviations between transform coefficients like those shown in FIG. 10 and the common components in FIG. 11.

For example, transform coefficients obtained by dividing the respective transform coefficients of series A in FIG. 10 by the common transform coefficients in FIG. 11 may be stored as the transform coefficients for the R value at the respective grid points in series A in the 3DLUT 4a in FIG. 9.

Furthermore, transform coefficients obtained by dividing the respective transform coefficients of series B in FIG. 10 by the common transform coefficients in FIG. 11 may be stored as the transform coefficients for the R value at the respective grid points in series B in the 3DLUT 4a in FIG. 9. Also for the other series, the transform coefficients for the R value in the 3DLUT 4a are defined similarly.

Figure 12:
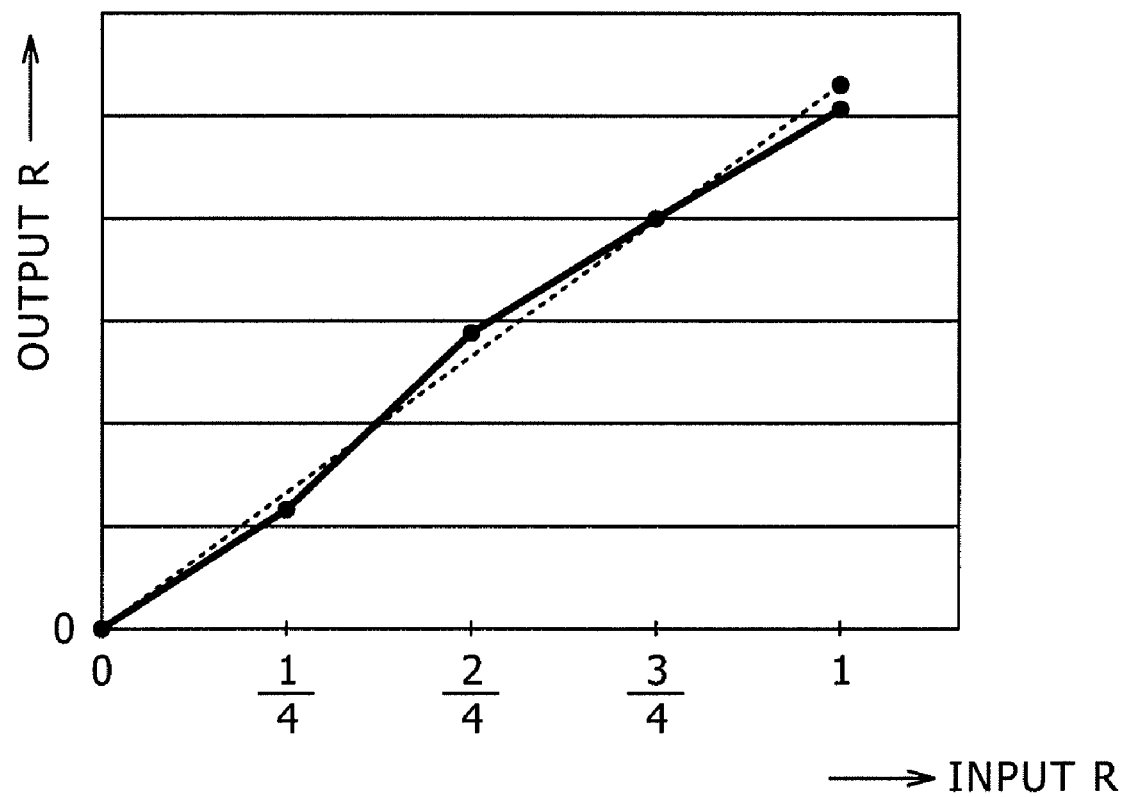
FIG. 12 is an explanatory diagram of transform coefficients of a certain series in the 3DLUT according to one embodiment of the present invention.
Figure 13B:
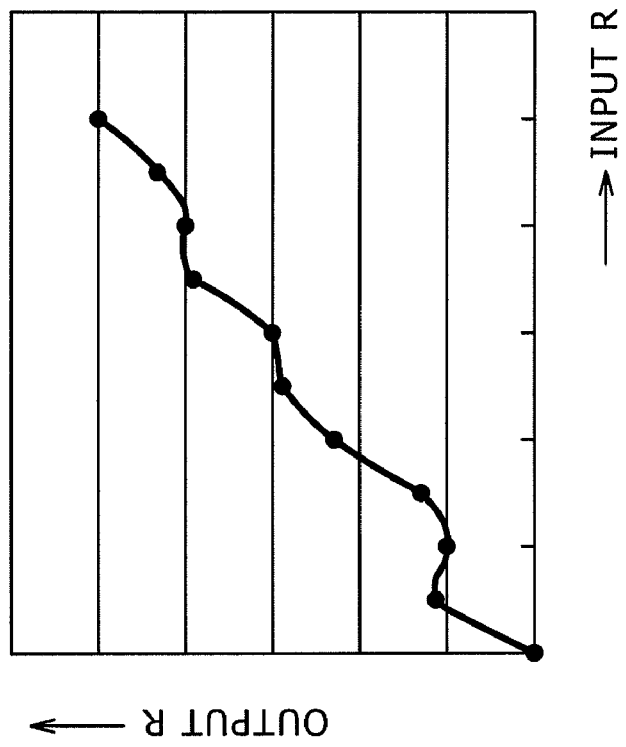
FIGS. 13A and 13B are explanatory diagrams of interpolation of transform coefficients in a 1DLUT according to one embodiment of the present invention.
Figure 13A:
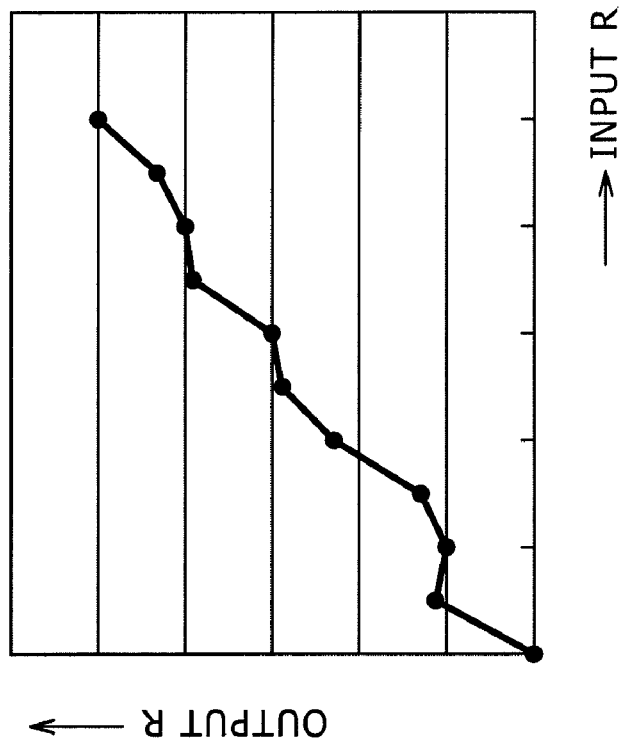
Figure 14:
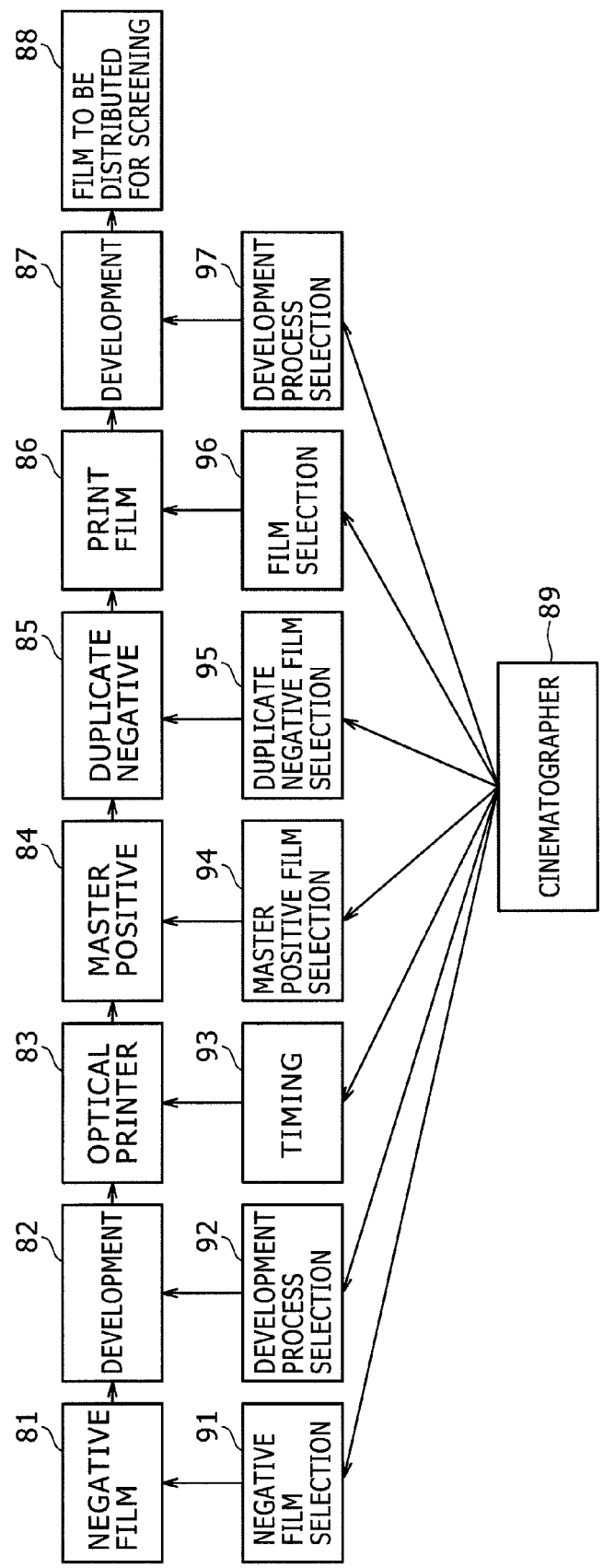
FIG. 14 is an explanatory diagram showing related-art processing from acquisition of a negative film to acquisition of a film to be distributed for screening.

The transform coefficients for the R value at five grid points in a certain series of series A to Y are as shown in FIG. 12 for example. The deviation of these transform coefficients from a straight line is small.

The above description relates to the R value. However, the same concept can be applied also to the G value and the B value at each grid point in the 3DLUT 4a and the transform coefficients in the G-1DLUT 3b and the B-1DLUT 3c.

Specifically, the R-1DLUT 3a performs transform of the common one-dimensional transform components in three-dimensional transform for conversion from the input color gamut to the output color gamut for the R value.

The G-1DLUT 3b performs transform of the common one-dimensional transform components in three-dimensional transform for conversion from the input color gamut to the output color gamut for the G value.

The B-1DLUT 3c performs transform of the common one-dimensional transform components in three-dimensional transform for conversion from the input color gamut to the output color gamut for the B value.

In the three-dimensional transform for conversion from the input color gamut to the output color gamut, the 3DLUT 4a performs transform with three-dimensional transform components from which the above-described common one-dimensional transform components about the R, G, B values are excluded.

In this case, the 3DLUT 4a is provided with a comparatively small table structure, such as a structure in which the number of transform coefficients on the respective axes is 5×5×5. On the other hand, the number of transform coefficients on the one-dimensional transform axis in the 1DLUTs 3a, 3b, and 3c is set larger than the number of transform coefficients on each transform axis in the 3DLUT 4a. For example, the number of transform coefficients on the one-dimensional transform axis in the 1DLUTs 3a, 3b, and 3c is set to eleven.

The 3DLUT 4a with a structure of 5×5×5 is one example for convenience of description. For example, if the 3DLUT 4a is provided with a structure of 17×17×17, the 1DLUTs 3a, 3b, and 3c are provided with a one-dimensional transform axis structure with a larger number of transform coefficients, such as 32 or 64 transform coefficients.

As described above, if the number of coefficient data is reduced, the color conversion suffers from influence due to interpolation processing and the conversion error and the image quality are greatly affected. Furthermore, if the value of the transform coefficient becomes larger, the influence of the error due to the interpolation processing becomes too large to be ignored.

To address this, in the present example, the number of grid points in the 3DLUT 4a is set to e.g. about 17×17×17 as an appropriate value that is easily treated. Furthermore, the 1DLUTs 3a, 3b, and 3c corresponding to the R, G, and B values, respectively are prepared as one-dimensional transform tables separately from the 3DLUT 4a.

In addition, common one-dimensional components are extracted from the original three-dimensional transform coefficients and used as one-dimensional transform coefficients. As the respective transform coefficients in the 3DLUT 4a, coefficients as the deviations between the original transform coefficients in the three dimension and the above-described one-dimensional transform coefficients are stored.

By separating the one-dimensional transform coefficients from the three-dimensional transform coefficients and executing processing separately in this manner, processing with the 3DLUT 4a having small three-dimensional transform coefficients is possible. This can minimize the transform error and image quality deterioration.

Furthermore, with the 1DLUTs 3a, 3b, and 3c, processing is executed with a larger number of transform coefficients than that of transform coefficients in the 3DLUT 4a. Thereby, regarding the common components of the transform coefficients, more precise transform is performed. Thus, even when the 3DLUT 4a has a comparatively small structure with a small number of transform coefficients, color gamut conversion with high precision is realized.

For the separation of the transform coefficients into three-dimensional components and one-dimensional components, the following scheme is employed in the above-described example. Specifically, regarding one axis of the three-dimensional coefficients, the variances of the grid points on the other two axes of the respective grid points are calculated and the obtained variance values are employed as the one-dimensional coefficients of this one axis. However, a scheme other than this scheme may be employed as long as the scheme can decrease the variance rate of the values of the three-dimensional coefficients.

Furthermore, image distortion can be suppressed by interpolating the one-dimensional transform coefficients in the 1DLUTs 3a, 3b, and 3c through calculation with a de Boor-Cox recursive formula.

For example, if an RGB color gamut space cubic is employed as the three-dimensional space, the following scheme is possible. Specifically, from the three-dimensional RGB transform coefficients of 17×17×17, three-dimensional RGB coefficients of 17×17×17 and 17 one-dimensional transform coefficients for each of R, G, and B are obtained. In addition, the one-dimensional transform coefficients are interpolated to increase the number thereof to 64 for reduction in the image conversion error. In this scheme, the interpolation is carried out for one-dimensional transform coefficients like those in FIG. 13A for example to thereby create a larger number of one-dimensional transform coefficients like those in FIG. 13B.

Although an RGB color space is used as the three-dimensional color gamut in the present example, it is also possible to use a Lab color space, a Ycc color space, an XYZ color space, or the like.

5. Advantageous Effects of Embodiment and Modification Examples

As described above, according to the present embodiment, with use of an operation screen like that shown in FIG. 2, the same selection of the kinds of films, the development processes, the characteristics of the film printer, and so on as that in the case in which films from a negative film to a film to be distributed for screening are obtained as cinema films. Therefore, an operator such as a cinematographer can execute processing for allowing a video signal obtained by an electronic imaging system to have the same color tone and contrast as those of the cinema films, by utilizing a skill for processing the cinema films.

In this case, the video itself that is processed through the operation can be checked on the display screen of the display unit, and thus operation with check of the processing result is possible.

The video displayed on the display unit 14 is the video for which the color correction processing including the selection of a film for screening and the development therefor has been finally executed. Therefore, the video to be screened as a cinema can be checked. The video signal supplied to the film print creator 15 is a video signal obtained without correction relating to a film for screening and the development therefor.

The video on the film for screening has the same characteristics as those of the video displayed on the display unit 14.

Furthermore, the video signal output from the output unit 13a also corresponds to the video for which the color correction processing including the selection of a film for screening and the development therefor has been finally executed. This video signal serves as a video signal to be used for electronic screening with use of a video projector and a video signal that is correctly adjusted as content to be recorded in a medium such as a disk for sale.

In the above-described embodiment, the color conversion characteristics are stored in the memory. However, the color conversion characteristics that can be calculated through calculation processing with use of an arithmetic expression may be obtained through calculation.

The device shown in FIG. 1 is an example configured as a dedicated device for correcting the color characteristics. However, by installing a program (software) for executing the processing of the present example in any of various kinds of computer devices configured as an information processing device, this computer device may be so configured as to function as a device similar to the dedicated device. In this case, a program for carrying out displaying and operation like those shown in FIG. 2 and a program for executing color conversion processing like that shown in the flowchart of FIG. 6 are prepared.

The color conversion processing described with reference to FIG. 7 and subsequent diagrams is one example, and the embodiment of the present invention is not limited thereto. The operation screen shown in FIGS. 2 to 5 is also one example, and the embodiment of the present invention is not limited to these indication examples. For example, part of the selection items shown in FIG. 2 may be omitted. In addition, the codes of the kinds of films and so on are also one example, and the embodiment of the present invention is not limited to the indication examples.

The present application contains subject matter related to that disclosed in Japanese Priority Patent Application JP 2008-222813 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A video conversion device comprising:
 a color characteristic memory configured to store color characteristics of a plurality of kinds of cinema films, color characteristics relating to a plurality of kinds of development processes in development of the cinema film, and color characteristics relating to adjustment of a film printer;
 a color characteristic correction processor configured to carry out, for an input video signal, correction with use of a color characteristic that is stored in the color characteristic memory and relates to a kind of cinema film, a color characteristic that is stored in the color characteristic memory and relates to a development process, and a color characteristic in printing of the cinema film, the color characteristic correction processor outputting a corrected video signal;
 a selector configured to allow, based on operation with a predetermined operation screen, selection of a negative film, selection of a film for intermediate processing for acquisition of a film for screening from the selected negative film, selection of the film for screening, selection of development processes for the selected films, and selection of a color characteristic of the film printer; and
 a controller configured to read out color characteristics that are stored in the color characteristic memory and each correspond to a respective one of selected items based on selection by the selector, and cause the color characteristic correction processor to carry out correction with all of the read color characteristics.

2. The video conversion device according to claim 1, wherein operation screen displaying with the selector includes at least a selection screen for a negative film, a selection screen for a development process for a negative film, a selection screen for a color characteristic in printing of a negative film by the film printer, a selection screen for a film for intermediate processing, a selection screen for a film for screening, and a selection screen for a development process for a film for screening.

3. The video conversion device according to claim 2, further comprising
 a video display unit configured to display, together with the operation screen, video based on a video signal resulting from execution of color characteristic correction processing by the color characteristic correction processor dependent on a condition selected by the selector.

4. The video conversion device according to claim 3, wherein
 the color characteristic correction processor outputs, as a video signal resulting from color characteristic correction, a first corrected video signal resulting from color correction relating to all of items selected by the selector and a second corrected video signal resulting from color correction excluding color correction relating to selection of a film for screening and color correction relating to selection of a development process for a film for screening,
 the first corrected video signal is used as a video signal for creating a film for screening, and
 the second corrected video signal is used as a video signal to be displayed on the video display unit.

5. The video conversion device according to claim 2, wherein
 the selection screen for a development process has at least an operation screen for selection as to whether or not sensitization or desensitization in film development is present.

6. The video conversion device according to claim 2, wherein
 the color characteristic correction processor includes:
 a one-dimensional transformer that performs one-dimensional transform of first, second, and third color data that form an input video signal and are defined in a three-dimensional color gamut, by first, second, and third one-dimensional lookup tables, and
 three-dimensional transformer that performs three-dimensional transform of the first, second, and third color data resulting from one-dimensional transform by the one-dimensional transformer by a three-dimensional lookup table to thereby obtain first, second, and third color data that form a video signal to be output.

7. A video conversion method comprising the steps of:
 executing color characteristic storing processing of storing color characteristics of a plurality of kinds of cinema films, color characteristics relating to a plurality of kinds of development processes in development of the cinema film, and color characteristics relating to adjustment of a film printer;

executing color characteristic correction processing of carrying out, for an input video signal, correction with use of a color characteristic that is stored in the color characteristic storing processing and relates to a kind of cinema film, a color characteristic that is stored in the color characteristic storing processing and relates to a development process, and a color characteristic in printing of the cinema film, and outputting a corrected video signal;

executing selection processing of allowing, based on operation with a predetermined operation screen, selection of a negative film, selection of a film for intermediate processing for acquisition of a film for screening from the selected negative film, selection of the film for screening, selection of development processes for the selected films, and selection of a color characteristic of the film printer; and reading out color characteristics that are stored in the color characteristic storing processing and each correspond to a respective one of selected items based on selection in the selection processing, for carrying out correction with all of the read color characteristics as the color characteristic correction processing.

8. A program, embodied on a non-transitory computer readable medium, comprising the steps of:

executing color characteristic storing processing of storing color characteristics of a plurality of kinds of cinema films, color characteristics relating to a plurality of kinds of development processes in development of the cinema film, and color characteristics relating to adjustment of a film printer;

executing color characteristic correction processing of carrying out, for an input video signal, correction with use of a color characteristic that is stored in the color characteristic storing processing and relates to a kind of cinema film, a color characteristic that is stored in the color characteristic storing processing and relates to a development process, and a color characteristic in printing of the cinema film, and outputting a corrected video signal;

executing selection processing of allowing, based on operation with a predetermined operation screen, selection of a negative film, selection of a film for intermediate processing for acquisition of a film for screening from the selected negative film, selection of the film for screening, selection of development processes for the selected films, and selection of a color characteristic of the film printer; and reading out color characteristics that are stored in the color characteristic storing processing and each correspond to a respective one of selected items based on selection in the selection processing, for carrying out correction with all of the read color characteristics as the color characteristic correction processing.

9. A video conversion device comprising:

color characteristic memorizing means for storing color characteristics of a plurality of kinds of cinema films, color characteristics relating to a plurality of kinds of development processes in .development of the cinema film, and color characteristics relating to adjustment of a film printer;

color characteristic correction processing means for carrying out, for an input video signal, correction with use of a color characteristic that is stored in the color characteristic memorizing means and relates to a kind of cinema film, a color characteristic that is stored in the color characteristic memorizing means and relates to a development process, and a color characteristic in printing of the cinema film, and outputting a corrected video signal;

selecting means for allowing, based on operation with a predetermined operation screen, selection of a negative film, selection of a film for intermediate processing for acquisition of a film for screening from the selected negative film, selection of the film for screening, selection of development processes for the selected films, and selection of a color characteristic of the film printer; and controlling means for reading out color characteristics that are stored in the color characteristic memorizing means and each correspond to a respective one of selected items based on selection by the selecting means, and causing the color characteristic correction processing means to carry out correction with all of the read color characteristics.

* * * * *